US00RE41323E

(19) United States
(12) Reissued Patent
Kellerer et al.

(10) Patent Number: US RE41,323 E
(45) Date of Reissued Patent: May 11, 2010

(54) TRANSPORT CONTAINER

(75) Inventors: Richard Kellerer, Munich (DE); Christian Barth, Munich (DE); Heinz Oster, Starnberg (DE)

(73) Assignee: IFCO Systems GmbH, Pullach (DE)

(21) Appl. No.: 11/502,580

(22) Filed: Oct. 21, 2006

Related U.S. Patent Documents

Reissue of:
(64) Patent No.: 6,772,897
Issued: Aug. 10, 2004
Appl. No.: 10/068,504
Filed: Feb. 5, 2002

(51) Int. Cl.
*B65D 25/00* (2006.01)

(52) U.S. Cl. ..... 220/7; 220/6
(58) Field of Classification Search ..... 220/4.28, 220/6.7
See application file for complete search history.

(56) References Cited

U.S. PATENT DOCUMENTS

| | | | | | |
|---|---|---|---|---|---|
| 3,987,945 | A | * | 10/1976 | McDowell | 224/275 |
| 4,591,065 | A | * | 5/1986 | Foy | 220/7 |
| 4,917,255 | A | * | 4/1990 | Foy et al. | 220/6 |
| 5,062,671 | A | * | 11/1991 | Goetz et al. | 292/175 |
| 5,161,709 | A | * | 11/1992 | Oestreich, Jr. | 220/6 |
| 5,195,644 | A | * | 3/1993 | Schmid | 220/6 |
| 5,632,392 | A | * | 5/1997 | Oh | 220/7 |
| 6,367,639 | B1 | * | 4/2002 | Mar | 215/213 |
| 6,398,054 | B1 | * | 6/2002 | Overholt et al. | 220/7 |

FOREIGN PATENT DOCUMENTS

| | | | | |
|---|---|---|---|---|
| FR | 2686118 | A1 | * | 7/1993 |
| GB | 418675 | A | * | 10/1934 |
| GB | 418675 | | * | 10/1934 |
| GB | 2175285 | | * | 11/1986 |
| GB | 2175285 | A | * | 11/1986 |
| WO | WO 96 32333 | | * | 10/1996 |
| WO | WO 9632333 | A1 | * | 10/1996 |

* cited by examiner

*Primary Examiner*—Anthony D Stashick
*Assistant Examiner*—Harry A Grosso
(74) *Attorney, Agent, or Firm*—Michael A. Glenn; Glenn Patent Group

(57) ABSTRACT

The present invention concerns a transport container, preferably made of plastic material, especially for vegetables, fruit and the like, with a floorboard (2) and several, preferably four, collapsible side walls (3, 4, 5, 6) that are arranged circumferentially on the floorboard (2) and can be folded down onto it. According to a first aspect of the invention, the floorboard (2) is provided with an essentially rectangular frame (8) in which there extends a floor profile (9) with a smooth surface, said floor profile (9) being stiffened by the provision of several bulges (10) that are formed by the curvature of the floor profile (9) in several space directions. According to a second aspect of the invention, the collapsible side walls (3, 4, 5, 6) can be fastened to each other in the upright position by means of a fastening mechanism (7, 4) provided on adjacent side walls (3, 5; 3, 6; 5, 4; 5, 6) in which a fastening bolt of a fastener arranged on one side wall (3, 5) can engage with a recess in the adjacent side wall), where the fastener (7), which is essentially accommodated in the side wall (3, 5), comprises or operates a displaceable element (16) that can be displaced against the force of an elastic spring element.

41 Claims, 7 Drawing Sheets

A-A

B-B

C-C

D-D

E-E

TRANSPORT CONTAINER

Figure 1:
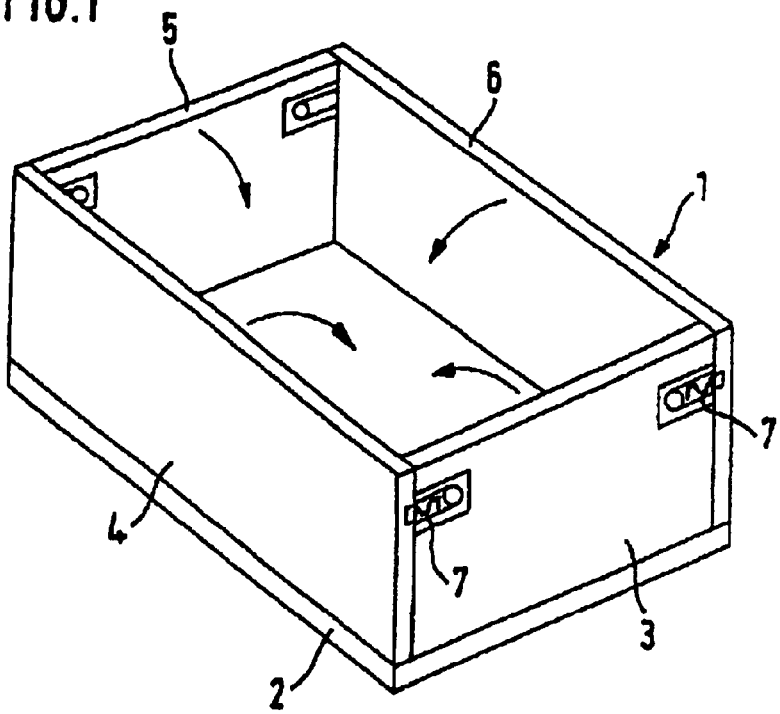

Matter enclosed in heavy brackets [ ] appears in the original patent but forms no part of this reissue specification; matter printed in italics indicates the additions made by reissue.

The present invention concerns a transport container, preferably made of plastic material, especially for vegetables and fruit in accordance with the descriptive part of Claim 1 or 9.

Collapsible transport containers made preferably of plastic materials are used for many different transport purposes, because they are not only very stable, but also very light and, given the fact that they can be folded, occupy very little space when they have to be transported in the empty state. Particularly the lightness of such transport containers is further enhanced by the fact that the provision of numerous strengthening ribs makes it possible to save a great deal of material. But this is associated with the drawback that especially the outside of the transport containers becomes very uneven and has numerous edges and recesses. Apart from dirt collection problems, this gives rise to such further problems that, especially in the area of the floorboard and when the transport containers are used to carry fruit, bananas for example, and have to be stacked on top of each other, any fruit projecting slightly above the upper edge of the lower container is liable to be damaged by the edges and strengthening ribs of the upper container.

Another disadvantageous feature of known collapsible transport containers derives from the fact that their sidewalls, which are secured to each other in the upright position by means of fastening elements, may already collapse when pressure acts on them. Although this is helpful for the purposes of quick and simple handling, it also has the disadvantage that, given inexpert handling, which the containers will often suffer in practice when they are in frequent use, the side walls will not be properly fastened in their upright position, which can lead to a collapse of the side wall during loading and stacking and consequent damage of the merchandise contained therein. Moreover, the currently used fastening and securing elements are often difficult to operate and not easy to locate on the containers. Often there is also the further problem that improper use may cause damage to the fastening and securing elements.

It is therefore the scope of the present invention to make available a collapsible transport container that will not be sensitive to excessive and improper use as may occur, for example, when the transport containers are overloaded and their side walls become subject to considerable and bumpy loads. In particular, the invention seeks to create a transport container that has as smooth as possible an underside and is devoid ribs and reinforcing stays, thereby avoiding the possibility of the merchandise in an underlying container becoming damaged due to these strengthening ribs being pressed into it. Nevertheless, the container floor should also be sufficiently stable to assure safe transport of the goods carried in the container. A further task of the present invention is to create a means of fastening the collapsible side walls to each other when in the upright position, where the said means is to be easy to operate, i.e. easy to open and close, and not sensitive to pressure or impact loads. In particular, ready handling is to be assured by enabling the user to open and close these fastening elements without having to change either his own position or that of the transport container.

This task is absolved by a transport container having the characteristics of Claims 1 and 9. Advantageous embodiments are set out in the dependent claims.

The transport container in accordance with the invention has an essentially rectangular floorboard that consists of a frame and a floor profile arranged in it. Attached to the frame there are collapsible side walls, preferably four in number, that can be swivelled between a folded position, in which they lie on the floorboard, and an upright position, in which they project upward from the floorboard and substantially make a right angle with it. The floor profile has a smooth upper and lower surface, both of which are wholly devoid of strengthening ribs or stays, and owes its stability to several bulges provided in the floor profile, the said bulges being obtained by curving the floor profile in several space directions. This results in a three-dimensional floor profile that the said bulges render adequately rigid and which, given the consequential possibility of avoiding the use of strengthening ribs, also has a smooth surface that is easy to keep clean and will not damage the underlying merchandise when the transport containers are stacked on top of each other, because the lack of strengthening ribs assures that no peak loads can occur in this area when it comes into contact with the underlying merchandise, and that there will rather be a uniformly distributed load.

Preferably the three-dimensional form of the floor profile is obtained by bending the floor profile upward in the manner of an arch along its shorter side and giving it a wavelike form along the longer side. A structure of this type will not only assure a particularly good rigidity, but will also bring with it a number of technical advantages in the production process.

Advantageously the bulges in the floor profile will be provided in such a manner that there will be horizontal floor sections between these bulges. This has the advantage that there will be at least some horizontal surfaces on which the merchandise to be carried in the transport container can bear. Over and above this, the presence of these horizontal floor sections assures that there will be areas where the floor profile can be attached to the surrounding frame in a very simple manner.

Correspondingly, in the presence of a stacking shoulder, which should preferably be provided on the floorboard, so that in a stack of transport containers it can engage (interlock) with the container lying beneath it, it will be advantageous to provide stacking grooves to permit staggered stacking of the transport containers, locating these grooves in the areas in which the horizontal sections of the floor profile border on the stacking shoulder or the frame of the floorboard. In this way one obtains a smooth transition from the floor profile to the frame of the floorboard in these areas.

In the case of a floorboard with a stacking shoulder it will also be advantageous to provide the bulges as depressions in the floor profile in such a manner that they will come to extend in the area between the upper end of the stacking shoulder and the lower end of the stacking shoulder. From the manufacturing point of view this offers the advantage that, starting from the horizontal floor sections, which can be attached to the upper end of the stacking shoulder, the outer border of the floor profile can always be attached to the stacking shoulder, i.e. when there are depressions along these borders right down to the lower end of the stacking shoulder.

Preferably the floor profile will be formed as a single piece with the frame, which can be done, for example, when the floorboard is made from plastic materials by means of injection moulding.

With a view to further enhancing the rigidity of the floor profile, it can be held in the frame in such a manner as to become subject to a prestressing force and, more particularly, in such a manner that the bulge (upward in the manner of an arch, for example) will become more pronounced due to the elastic stresses. In this way the carrying capacity of the floor profile can be further enhanced.

In accordance with a second aspect of the invention the collapsible transport container is provided with a device to keep the collapsible side walls secured to each other in their upright position, the said device consisting of a fastening mechanism on adjacent side walls. The said fastening mechanism comprises a fastener with a fastening bolt that is provided on one of the side walls, together with a recess in the adjacent side wall with which the fastening bolt can engage. The fastener consists of an element that can be displaced against the force of an elastic spring element, where the said displaceable element comprises or operates the fastening bolt and is substantially accommodated within the side wall. Given this accommodation of the fastener within a side wall, the fastener is advantageously protected against being damaged by forces that act on it from outside. Furthermore, the fact that the displaceable element is pretensioned by an elastic element or by the force that is needed to displace the displaceable element assures that an unintentional operation of the fastening mechanism due to the action of a pure pressure or force on the side wall can be excluded.

Advantageously the displaceable element will be arranged within the side wall in such a manner as to permit its being operated both from the outside of the side wall and from the inside. In particular, this can be obtained by inserting the displaceable element and therefore the fastener in a fastener cutout in the side wall in such a manner that the fastener can be operated from both sides of the side wall through gripping troughs arranged on both sides of the displaceable element or a gripping opening that extends right through it. The fact that the fastener can be operated from both sides has the advantage that all the side walls can be collapsed without either the operator having to change his position or the transport container having to be rotated.

From the point of view of manufacturing technique, moreover, the fact that the fastener can be inserted in a cutout provided in a side wall has the advantage that the fastener can be made as a single piece from plastic materials and then be simply clipped into the cutout in the side wall.

The fastener is preferably held and/or guided in the cutout in the side wall by means of notch elements constituted by projections, stays or the like. Since the displaceable element of the fastener in the side wall has to be displaced to operate the fastening bolt, the cutout opening must be sufficiently large to permit this displacement of the displaceable element. In order to assure that in a given position the fastening bolt and/or the displaceable element associated with it will be appropriately pre-tensioned by the elastic spring element, the displaceable element is arranged in the side wall in such a manner as to be connected to the side wall via the elastic element.

This can preferably be done by means of a holder plate that forms part of the fastener and is firmly attached to the side wall. Alternatively, however, the elastic element can also be attached directly to the side wall.

Since the displaceable element is linked to the side wall via the elastic element, the displaceable element is maintained in the position in which the elastic spring element is slack. This is preferably the fastened position, namely the one in which the fastening bolt is engaged with the recess in the adjacent side wall. This presetting in the fastened position effectively avoids an unintentional collapse of the transport container.

In a preferred embodiment of the fastener an essentially rectangular frame body acts as the displaceable element that at one of its ends is provided with either circular gripping troughs on both sides or a gripping opening that extends right through the element. The width of the frame body of displaceable element matches the thickness of the side wall, so that the fastener is essentially flush with the inside and/or the outside of the side wall. Within the frame body there is preferably arranged the elastic element, which is essentially and advantageously designed as an S-shaped spring and has one of its ends fixed to the side of the frame body opposite to the gripping trough and its other end fixed laterally either directly to the side wall or to holder plate of the fastener, this plate being preferably situated within the fastener cutout as a continuation of the side wall. This embodiment occupies particularly little space and also assures adequate protection of the spring element by the surrounding frame body. The S-shaped design of the spring assures a particularly long spring excursion that does not call for the application of any great force.

In a preferred embodiment the fastening bolt is arranged directly on the displaceable element on the side of the frame body opposite to the gripping trough or the gripping opening, so that the displacement of the displaceable element will also cause the displacement of the fastening bolt.

When the fastener is to be opened, i.e. when the adjacent side walls are to be detached from each other, the operator, inserting his hand in the gripping trough or the gripping opening, must displace the displaceable element against the spring force of the elastic element, so that the fastening bolt will become disengaged from the recess in the adjacent side wall. Since preferably the displaceable element is provided with a gripping trough on both sides or a gripping opening that passes right through the displaceable element, the holder plate, which is preferably arranged parallel to the surface of the side wall and the displacement path of the displaceable element, will extend only over a part area of the displaceable element, preferably about two thirds and will not therefore cover the area of the gripping trough or the gripping opening.

Figure 11:
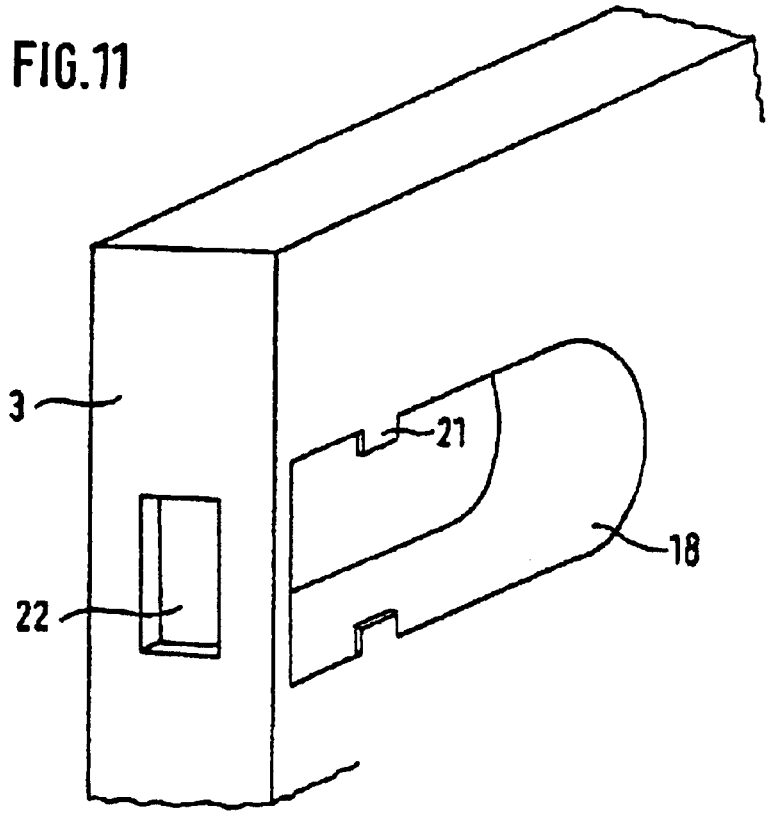
Figure 2:
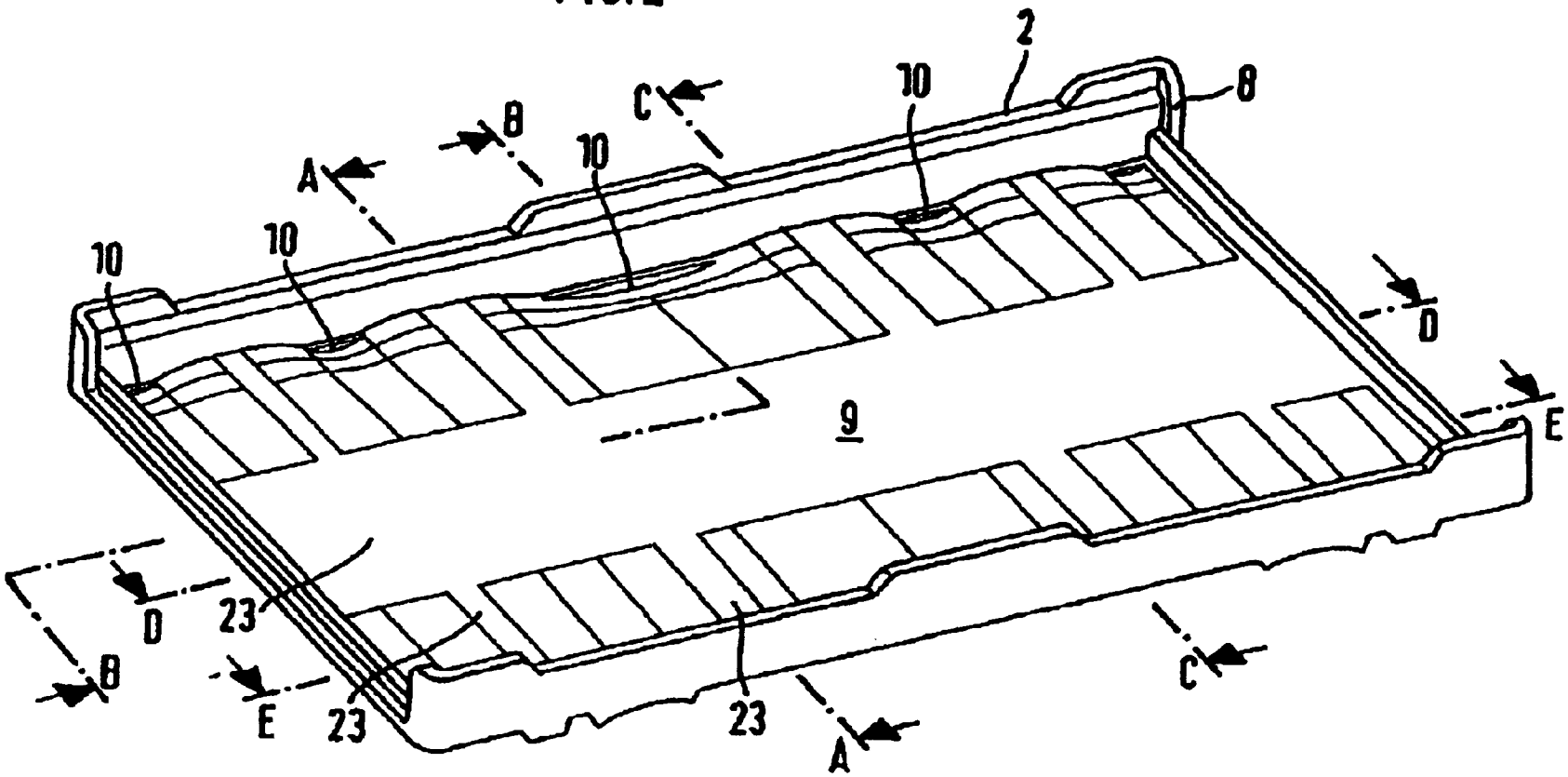
Figure 3:
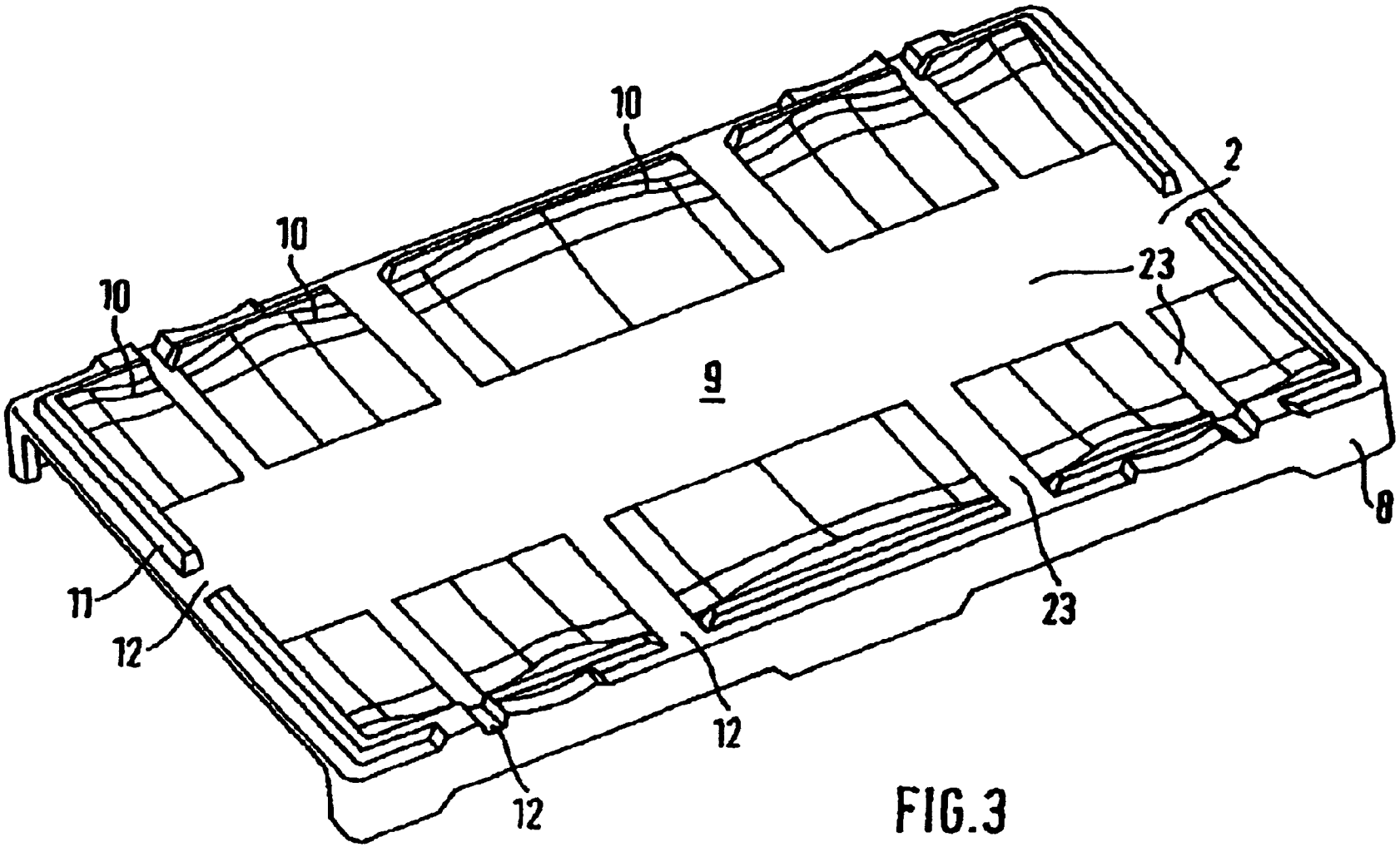
Figure 4:
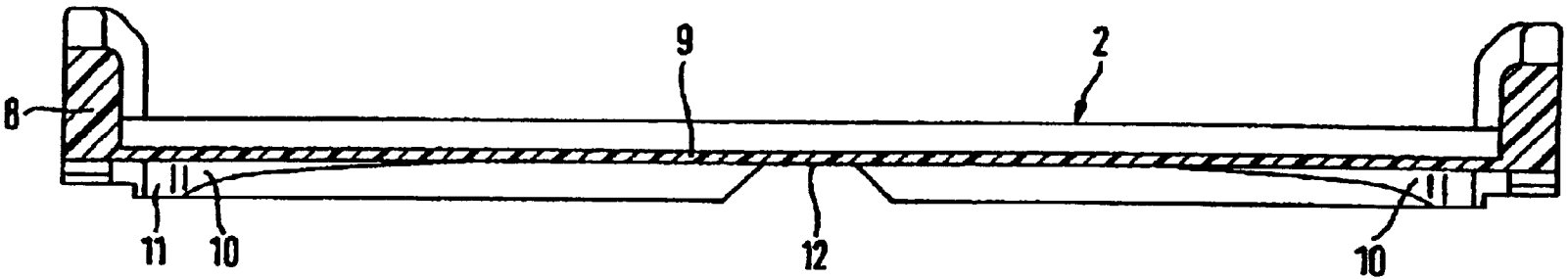
Figure 5:
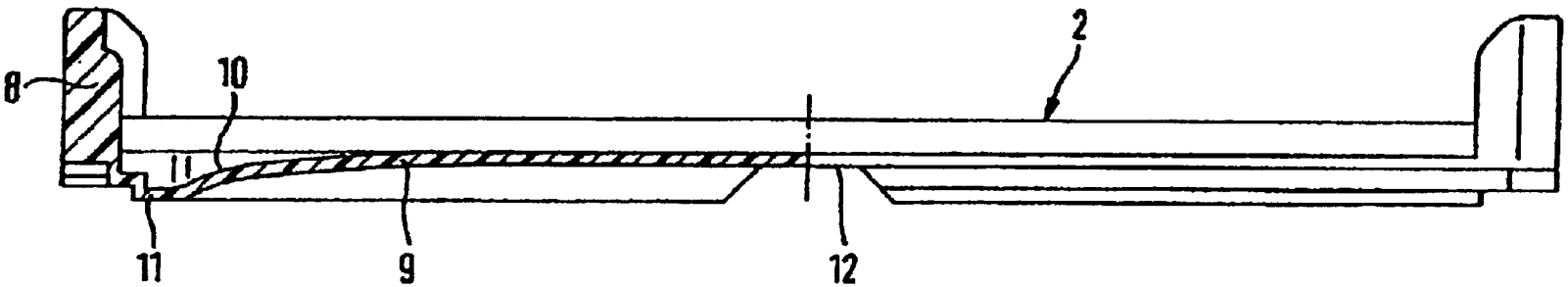
Figures 6, 7, 8:
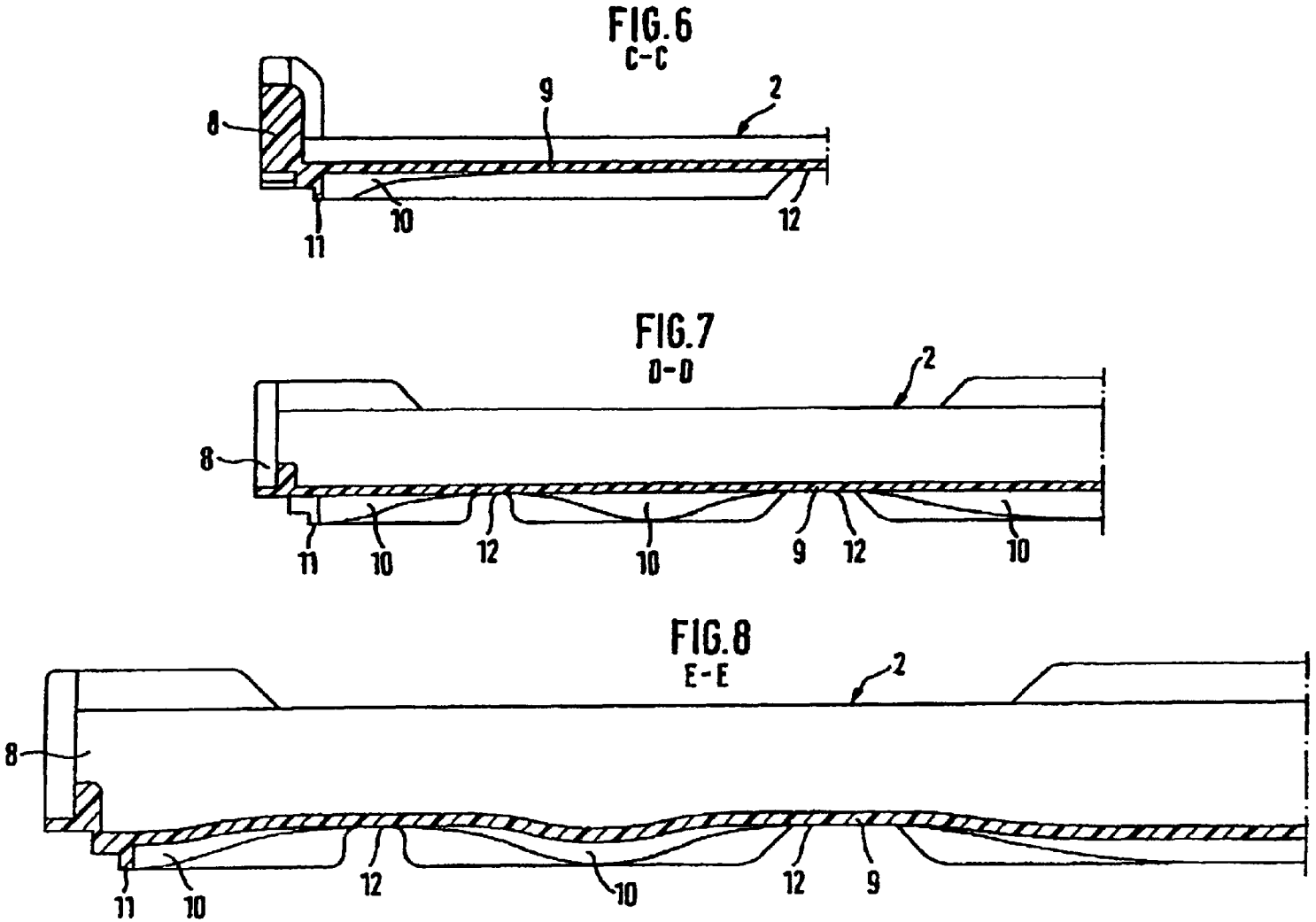
Figure 9:
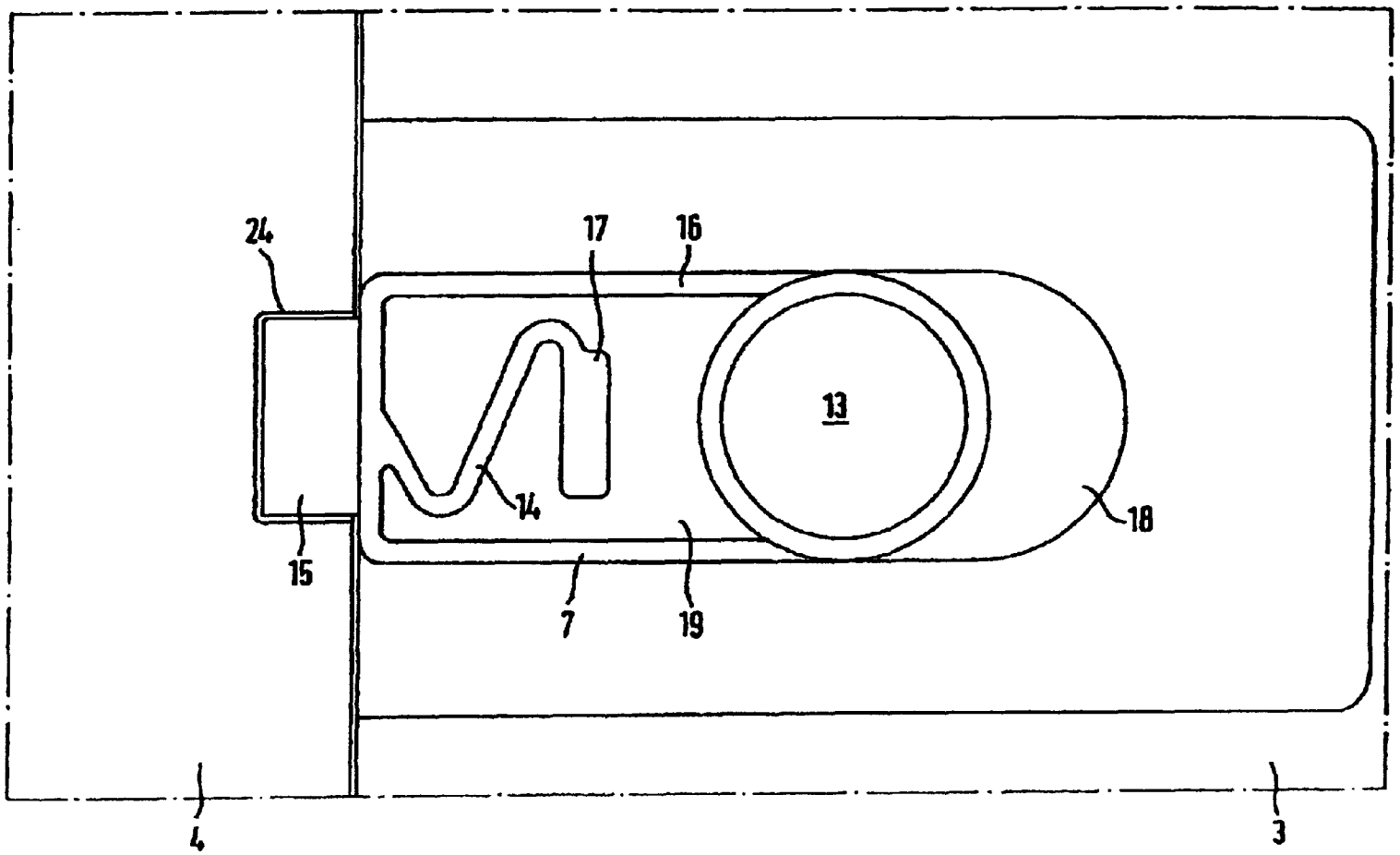
Figure 10A:
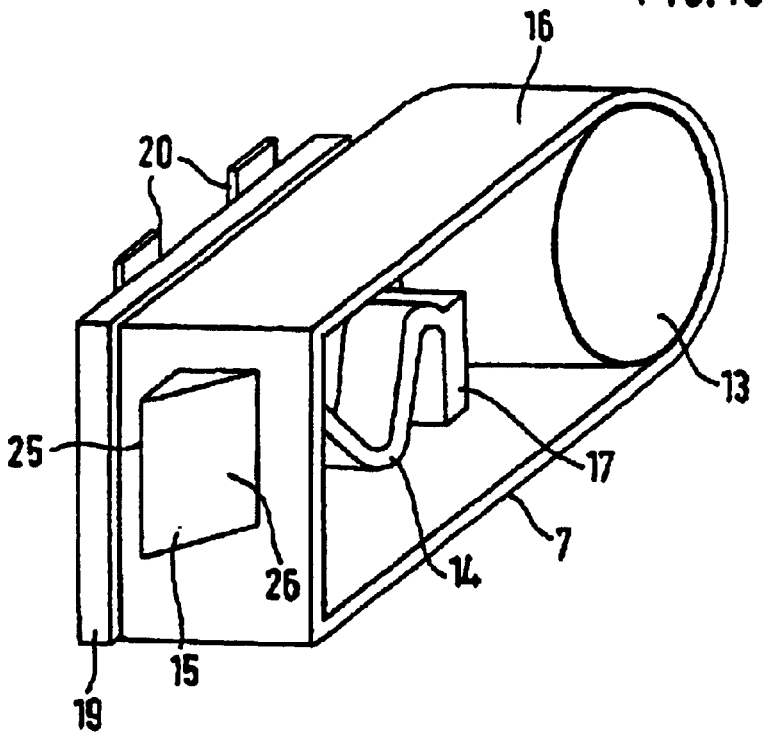

Other advantages, characteristics and features of the present invention will be brought out by the detailed description of possible embodiments to be given below with the help of the attached drawings. The drawings, all of which are purely schematic, show:

FIG. 1 a perspective view of a transport contained in accordance with the invention;

FIG. 2 a perspective view from above of the floorboard of a; transport container;

FIG. 3 a perspective view from above of the floorboard of a; transport container;

FIG. 4 a section view along the line A—A of FIG. 2;

FIG. 5 a partial section view along the line B—B of FIG. 2;

FIG. 6 a partial section view along the line C—C of FIG. 2;

FIG. 7 a partial section view along the line D—D of FIG. 2;

FIG. 8 a section view along the line E—E of FIG. 2;

FIG. 9 a partial side elevation of the transport container with a fastener mechanism in accordance with the invention;

FIGS. 10a) and b), respectively, a perspective view of the fastener in the fastened position (a) and in the retracted position (b) when the side walls are to be collapsed; and FIG. 11 a partial perspective view of a side wall into which the fastener can be inserted.

FIG. 1 shows a perspective view of a transport container 1 of which the side walls 3 to 6 are arranged on the floorboard 2 in such a manner that they can be collapsed in the direction of the arrows onto the floorboard 2. In order to secure the side walls 3 to 6 in an upright position, the embodiment shown in the drawing is provided with fasteners 7 on the side walls 3 and 5, which make it possible to fasten adjacent side walls, i.e. 3 and 4, 3 and 6, 5 and 4, and 5 and 6. For reasons of simplicity, the hinge elements that permit the side walls 3 to 6 to be swivelled with respect to the floorboard 2 have not been shown, since any of the known solution possibilities can be used for this purpose.

FIG. 2 shows a perspective view of just the floorboard 2 of the transport container illustrated in FIG. 1. The floorboard 2 consists of a frame 8 with side wall continuations of different heights, as well as a floor profile 9 that is arranged within the frame 8. The floor profile 9, which has a smooth surface on its upper and particularly also on its lower side, is characterized by a multitude of bulges 10 that are provided essentially at its edge along the long sides and in the corner areas. In the shown embodiment example the bulges 10, which serve to enhance the mechanical rigidity of the floor profile 9, are due to the fact that the floor profile 9 has a form that is bent upwards about its longitudinal axis and is wave-shaped along the long sides, especially in its border areas. The superposition of these three-dimensional forms leads to the bulges 10, which are therefore curvatures not just in a single space direction, but at least in two space directions. In FIG. 2 the nature of the bulges 10 is represented by the rectangular areas indicated at the edges of the longitudinal axis.

It can be seen from the figure that between the areas with bulges 10 there are horizontal floor sections 23 that extend essentially in a horizontal direction and separate the areas with bulges 10 from each other.

FIG. 3 shows the floorboard 2 of FIG. 2 as seen from the underside, so that the bulges 10, which in FIG. 2 are seen as depressions, are here shown as elevations. FIG. 3 further shows that the floorboard 2 of the illustrated embodiment example is provided with a stacking shoulder situated slightly inwards from the outer edge of the floorboard 2, so that when the transport containers 1 are stacked on top of each other, the said shoulder can engage with the top opening of the underlying transport container 1. In order to make possible also staggered stacking, the stacking shoulder 11 is provided with interruptions, so-called stacking grooves 12, that are arranged at different distances from each other along the stacking shoulder 11.

As shown in the case of the illustrated embodiment, the horizontal floor sections 23 will advantageously be aligned with the stacking grooves 12, thereby assuring a stable and simple transition from the stacking shoulder 11 or frame 8 to the floor profile 9.

FIG. 4 shows a section view along the line A—A of FIG. 2, i.e. along one of the horizontal floor sections 23 of the floor profile 9. In the section view the floor profile 9 is therefore shown as an even and plane surface between the frame 8. However, the section view also shows that outside the section plane the floor profile 9 becomes depressed by the bulges 10 right down to the bottom edge of the stacking shoulder 11. Moreover, in FIG. 4 one can also note a stacking groove 12 in one of the short sides.

FIG. 5 is a representation similar to FIG. 4 and provides a partial section view of an area in which the form of the floor profile 9 with its upward curvature along the shorter side causes bulges 10 to be situated along the edges of the longer sides of the floor profile 9. The bulge 10 is here seen as a depression of the floor profile 9 in the direction of the bottom edge of the stacking shoulder 11. There is thus a direct transition from the bottom edge of the stacking shoulder 11 to the floor profile 9.

A further section view in the area of a horizontal floor section 23 is shown in FIG. 6, which is therefore essentially similar to FIG. 4. There is a difference, however, inasmuch as the stacking shoulder 11 in this area is not provided with a stacking groove 12, so that there is no longer a smooth transition between the floor profile 12 and the frame 8, as is the case in FIG. 4, but the frame 8 is rather provided with a downward continuation in the form of the stacking shoulder 11.

A section through the floorboard 2 along its central longitudinal axis is shown in FIG. 7. Since this area is constituted by a horizontal floor section 23, the floor profile 9 is once again represented as an even and plane surface. However, the elevation view of the parts behind the section beautifully illustrates the wave form of the floor profile 9 along the longitudinal axis, which leads to several bulges 10 being situated along the longitudinal axis. FIG. 7 also shows that stacking grooves 12 are arranged so as to be aligned with the horizontal floor sections 23 and that the bulges constitute depressions in the areas between the stacking grooves 12.

The section view of FIG. 8, which represents a section parallel to the side wall in the vicinity of one of the long sides of the floorboard 2, provides a particularly good illustration of the wavelike bulging of the floor profile 9, which contributes to rendering the said floor profile more rigid. Starting from the central longitudinal axis of the floorboard 2, the curvature of the bulges 10 becomes gradually more pronounced in the direction of the longitudinal sides, that is to say, in the direction of the frame 8.

FIG. 9 shows a partial section view of the side walls 3 and 4 of the transport container of FIG. 1, with the side walls in their upright position and firmly held together by means of the fastening mechanism 7, 24. According to the representation of FIG. 9, the fastening mechanism 7, 24 comprises a fastener 7 with a fastening bolt 15 in the side wall 3, the said fastening bolt 15 engaging with a recess 24 in the adjacent side wall 4. An elastic spring element 14, which in the illustrated embodiment is designed in the form of an S, keeps the fastening bolt 15 preset in its fastened position. Opposing the force of the spring element 14, the fastening bolt 15 can be displaced from its fastened position, i.e. removed from the recess 24 in the adjacent side wall 4, when the displaceable element 16 of the fastener 7, on which the fastening bolt 15 is arranged, is displaced within the fastener cutout 18 in the side wall 3. To this end the displaceable element 16 is provided with a gripping trough 13 on both the inside and the outside of the side wall 3, into which the operator can insert one of his fingers.

The displaceable element 16, which is displaceably arranged within the fastener cutout 18 of the side wall 3, is held in the side wall 3 by means of a holder plate 19, which in its turn is connected to the elastic spring element 14 via the spring support 17.

Figure 10B:
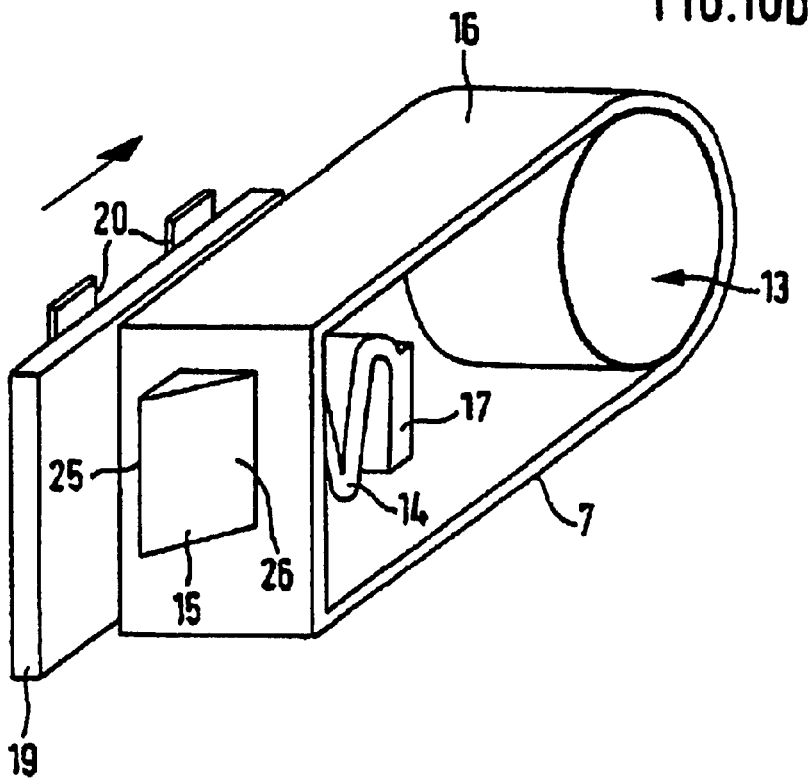

As can be seen more readily from FIGS. 10a and 10b, which however show only the fastener without the side wall, the holder plate 19 is fixed in the fastener cutout 18 of the side wall 3 by means of the notch elements 20. Alternatively, however, it would also be possible for the holder plate 19 to be designed as an integral part of the side wall and for the displaceable element 16 to be connected directly to the side wall 3 via the spring support 17, by means of a plug connection for example.

FIGS. 10a and 10b illustrate the situation of the fastener in the fastened position (FIG. 10a) and in the unfastened position (FIG. 10b). In the fastened position, which is shown in FIG. 10a, the force of the elastic spring element 14 so aligns the displaceable element 14, which essentially consists of a rectangular frame body that is rounded on one side, as to make the side on which the fastening bolt 15 is arranged terminate substantially flush with the front face of the holder plate 19. In this situation the elastic spring element 14 is therefore in an unloaded or nearly unloaded state. When the fastened position, in which the fastening bolt 15 engages with the recess 14 in the adjacent sidewall, has to be released, the displaceable element 16 is moved against the force of the elastic spring element 14 in the direction of the arrow shown in FIG. 10b. In this way the elastic spring element is compressed and will therefore be in a loaded state. The operator can move the displaceable element by placing a finger in the gripping trough 13.

When the fastener 7 is inserted in the side wall 3 or in the fastener cutout of the side wall 3 as shown in FIG. 11, the fastening bolt 15 will project through the bolt hole 22 in the side wall 3. When the displaceable element is moved as described above, the fastening bolt 15 is pulled backward through the bolt hole 22, so that the fastening bolt 15 will no longer project beyond the bolt hole 22. The side wall 3 can therefore be moved very simply with respect to the side wall 3 or the side wall 6.

Referring to FIG. 1, the transport container 1, given simultaneous operation of the fasteners 7 first of one of the side faces 3 or 5 and then of the other of the side faces 3 or 5, can therefore be collapsed by first folding the side faces 3 and 5 inwards and then doing likewise with the side faces 4 and 6. Since the fasteners 7 in accordance with the invention are accessible both from the inside and the outside, the operator can collapse the transport container 1 without having to change his position or having to rotate the transport container 1. The operation is thus greatly simplified.

The fact that the fastening bolt 15 is wedge-shaped and has a contact surface 25 and an oblique surface 26 assures that in the fastened position the fastening bolt 15 will be securely in contact with the recess 24, while the oblique surface 26 prevents the bolt from constituting an obstacle to the erection of the side walls.

What is claimed is:

1. A transport container with a floorboard and a plurality of collapsible side walls that are arranged circumferentially on the floorboard and can be folded down onto it, where the collapsible side walls can be fastened to each other in the upright position by means of a fastening mechanism provided on adjacent side walls in which a fastening bolt of the fastening mechanism on one side wall can engage with a recess in the adjacent side wall, characterized in that the [fastener] *fastening mechanism* comprises a displaceable element that is essentially accommodated in the side wall and can be displaced against the force of an elastic spring element, the elastic spring element contained within the [fastening mechanism] *displaceable element*.

2. The transport container of claim 1, characterized in that the displaceable element can be operated both from the outside and the inside of the side wall.

3. The transport container in accordance with claim 1 characterized in that the [fastener] *fastening mechanism* is inserted in a cutout in the side wall.

4. The transport container in accordance with claim 1 characterized in that the fastening bolt is preset in the fastened position by the force of the elastic spring element.

5. The transport container in accordance with claim 1, characterized in that the elastic spring element is arranged on the displaceable element, where the displaceable element is connected with the side wall via the elastic spring element.

6. The transport container in accordance with claim 1, characterized in that the fastener also comprises a holder plate that is arranged in a fixed position in the side wall where the said holder plate is connected to the displaceable element via the elastic element.

7. The transport container in accordance with claim 6, characterized in that the holder plate extends only over a part of the displaceable element[, (16)] preferably over about two thirds of the displaceable element.

8. The transport container in accordance with claim 1, characterized in that the fasteners terminates substantially flush with the inside or the outside of the side wall.

9. The transport container in accordance with claim 1, characterized in that the fastening bolt is provided with a contact surface and an oblique surface where the contact surface comes to be situated in the recess when in the fastened position, so that the side walls cannot be detached from each other without operating the displaceable element, while the oblique surface makes it possible for the fastening bolt to glide over the adjacent side wall.

10. The transport container in accordance with claim 1, characterized in that the [fastener] *fastening mechanism* is held in the fastener cutout by notch elements.

11. The transport container in accordance with claim 1, characterized in that the elastic element consists of an essentially S-shaped spring.

12. The transport container in accordance with claim 1, characterized in that the displaceable element is provided [either] with a gripping means trough on both sides.

13. The transport container in accordance with claim 1, characterized in that the displaceable element is designed as a frame body that is essentially rectangular, the width of the said frame body corresponding to the width of the side wall in which the displaceable element is accommodated.

14. The transport container in accordance with claim 1, characterized in that [fastener] *the fastening mechanism* is made as a single piece from plastic material.

*15. A transport container with a floorboard and a plurality of collapsible side walls—that are arranged circumferentially on the floorboard and can be folded down onto where the collapsible side walls can be fastened to each other in the upright position by means of a fastening mechanism provided on adjacent side walls in which a fastening mechanism on one side wall can engage with a recess in the adjacent side wall and the floorboard consisting of an essentially rectangular frame where there extends a floor profile with an essentially smooth surface, the said floor profile being stiffened by the provision of several bulges formed by the curvature of the floor profile in several direction, each of said fastening mechanisms comprising a displaceable element that is essentially accommodated in the associated side wall and can be displaced against the force of an elastic spring element, the elastic spring element contained within the displaceable element.*

*16. The transport container in accordance with claim 15 characterized in that bulges are formed by an arch-like upward curvature of the floor profile over the length of the short side and wavelike shape of the floor profile along the long side.*

*17. The transport container in accordance with claim 16 characterized in that the bulges of the floor profile are at least partially separated from each other by horizontal floor sections.*

*18. The transport container in accordance with claim 17 characterized in that the bulges of the floor profile are at least partially separated from each other by horizontal floor sections.*

*19. The transport container in accordance with claim 18 characterized in that the bulges of the floor profile are at least partially separated from each other by horizontal floor sections.*

*20. The transport container in accordance with claim 19 characterized in that the horizontal floor sections are provided in the area of the stacking grooves.*

*21. The transport container in accordance with claim 20 characterized in that the bulges represent depressions that, starting from the horizontal floor sections at the level of the upper end of the stacking shoulder extend right down to the bottom end of the stacking shoulder.*

*22. The transport container in accordance with claim 21 characterized in that the floor profile is pre-stressed before being inserted into the frame.*

*23. The transport container in accordance with claim 22 characterized in that the floor profile is formed as a single piece with the frame.*

*24. A transport container with a floorboard and a plurality of collapsible side walls—that are arranged circumferentially on the floorboard and can be folded down where the collapsible side walls can be fastened to each other in the upright position by means of a fastening mechanism provided on adjacent side walls in which a fastening mechanism on one side wall can engage with a recess in the adjacent side wall, the fastening mechanism having a displaceable element that is essentially accommodated in the side wall and can be displaced against the force of an elastic spring element contained within the fastening mechanism, and the floorboard consisting of an essentially rectangular frame where there extends a floor profile with an essentially smooth surface, the said floor profile being stiffened by the provision of several bulges formed by the curvature of the floor profile in several direction.*

*25. The transport container in accordance with claim 24 characterized in that bulges are formed by an arch-like upward curvature of the floor profile over the length of the short side and wavelike shape of the floor profile along the long side.*

*26. The transport container in accordance with claim 25 characterized in that bulges are formed by an arch-like upward curvature of the floor profile over the length of the short side and wavelike shape of the floor profile along the long side.*

*27. The transport container in accordance with claim 25 characterized in that the bulges of the floor profile are at least partially separated from each other by horizontal floor sections.*

*28. The transport container in accordance with claim 25 characterized in that the bulges of the floor profile are at least partially separated from each other by horizontal floor sections.*

*29. A transport container, preferably made of plastic material with a floorboard and several preferably four, collapsible side walls arranged circumferentially on the floorboard and foldable down onto it, characterized in that the floorboard consists of an essentially rectangular frame in which there extends a floor profile with an essentially smooth surface, the said floor profile being stiffened by the provision of several bulges that are formed by the curvature of the floor profile in several directions, the floor profile formed as a single piece with the frame and that the floor profile prestressed before being inserted in the frame, the collapsible side walls being fastenable to each other in the upright position by means of a fastening mechanism provided on adjacent side walls in which a fastening mechanism on one side wall can engage with a recess in the adjacent side wall, each of said fastening mechanisms comprising a displaceable element that is essentially accommodated in the associated side wall and can be displaced against the force of an elastic spring element, the elastic spring element contained within the displaceable element.*

*30. The transport container in accordance with claim 29 characterized in that the floor profile is essentially rectangular in shape and has a short side and a long side, where the bulges are formed by an arch-like upward curvature of the floor profile over the length of the short side and a wavelike shape of the floor profile along the long side.*

*31. The transport container in accordance with claim 29 characterized in that the bulges of the floor profile are at least partially separated from each other by horizontal floor sections.*

*32. The transport container in accordance with claim 29 characterized in that the floorboard is provided with a stacking shoulder with stacking grooves.*

*33. The transport container in accordance with claim 29 characterized in that the horizontal floor sections are provided in the area of the stacking grooves.*

*34. The transport container in accordance with claim 29 characterized in that the bulges represent depressions that, starting from the horizontal floor sections at the level of the upper end of the stacking shoulder, extend right down to the bottom end of the stacking shoulder.*

*35. A transport container, preferably made of plastic material, especially for vegetables, fruit and the like, with a floorboard and several collapsible side walls that are arranged circumferentially on the floorboard and can be folded down onto it characterized in that the floorboard has a floor profile, and the floorboard is formed as a single piece with the frame and that the collapsible side walls can be fastened to each other in the upright position by means of a fastening mechanism provided on adjacent side walls in which a fastening mechanism on one side wall can engage with a recess in the adjacent side wall, the fastening mechanism having a displaceable element that is essentially accommodated in the side wall and can be displaced against the force of an elastic spring element, the elastic spring element contained within the displaceable element.*

*36. The transport container of claim 35 in that the floorboard consists of an essentially rectangular frame in which there extends a floor profile with a essentially smooth surface, the said floor profile being stiffened by the provision of several bulges that are formed by the curvature of the floor profile in several space directions.*

*37. The transport container in accordance with claim 36 characterized in that the bulges of the floor profile are at least partially separated from each other by horizontal floor sections.*

*38. The transport container in accordance with claim 37 characterized in that the floorboard is provided with a stacking shoulder with stacking grooves.*

*39. The transport container in accordance with claim 38 characterized in that the horizontal floor sections are provided in the area of the stacking grooves.*

*40. The transport container in accordance with claim 34 characterized in that the bulges represent depressions that, starting from the horizontal floor sections at the level of the upper end of the stacking shoulder, extend right down to the bottom end of the stacking shoulder.*

*41. The transport container in accordance with claim 35 characterized in that the floor profile is formed as a single piece with the frame.*

* * * * *